(12) United States Patent
Meyers

(10) Patent No.: US 7,770,333 B2
(45) Date of Patent: Aug. 10, 2010

(54) ADAPTER RING FOR ON-SITE WASTE TREATMENT OR DRAINAGE SYSTEMS

(75) Inventor: Theodore W. Meyers, Barrington, IL (US)

(73) Assignee: Tuf-Tite, Inc., Lake Zurich, IL (US)

( * ) Notice: Subject to any disclaimer, the term of this patent is extended or adjusted under 35 U.S.C. 154(b) by 1281 days.

(21) Appl. No.: 10/966,915

(22) Filed: Oct. 15, 2004

(65) Prior Publication Data

US 2006/0081629 A1     Apr. 20, 2006

(51) Int. Cl.
*E02D 29/14*     (2006.01)
(52) U.S. Cl. .................. 52/19; 220/4.03; 220/4.26; 404/25
(58) Field of Classification Search ............ 52/19, 52/20, 21, 98, 100, 141; 404/25, 26; 220/4.04–4.07, 220/4.26, 4.03; 174/38, 39; 405/41, 80, 405/83, 143, 136, 137
See application file for complete search history.

(56) References Cited

U.S. PATENT DOCUMENTS

| | | |
|---|---|---|
| 537,182 A | 4/1895 | Brown |
| 871,977 A | 11/1907 | Winslow |
| 1,258,839 A | 3/1918 | Wheeler |
| 1,469,459 A | 10/1923 | Quigley |
| 1,712,510 A | 5/1929 | Monie |
| 1,793,038 A | 2/1931 | Zimmermann |
| 2,110,788 A | 3/1938 | Brauer |
| 2,111,462 A | 3/1938 | Simpson |
| 2,344,206 A | 3/1944 | Forni |
| 2,545,577 A | 3/1951 | Griffin |
| 2,593,918 A | 4/1952 | Redman |
| 2,661,019 A | 12/1953 | Snyder et al. |
| 3,134,264 A | 5/1964 | Miller |
| 3,230,674 A | 1/1966 | Christensen |
| 3,259,248 A | 7/1966 | Wiegand |
| 3,385,012 A | 5/1968 | Lovegreen |
| 3,596,419 A | 8/1971 | Jalbert |
| 3,611,889 A | 10/1971 | Levinson |

(Continued)

FOREIGN PATENT DOCUMENTS

DE     1 964 319     7/1971

(Continued)

OTHER PUBLICATIONS

Polylok, Inc. brochure entitled "Polylok's New Super Risers" (understood to be published in Apr. 2002).

(Continued)

*Primary Examiner*—Richard E Chilcot, Jr.
*Assistant Examiner*—William V Gilbert
(74) *Attorney, Agent, or Firm*—Marshall, Gerstein & Borun LLP

(57) ABSTRACT

An adapter for a tank, having a bottom with one or more adhesive-receiving channels formed therein, an inner wall, structure for supporting a riser component on the adapter, and wall reinforcement structure. The adapter is particularly suited to providing pre-cast concrete tank lids with structural, interengaging support for a column of stackable riser components to form a passageway to facilitate access to the tank from a higher elevation.

20 Claims, 9 Drawing Sheets

U.S. PATENT DOCUMENTS

| | | |
|---|---|---|
| 3,772,826 A | 11/1973 | Ferver |
| 3,883,005 A | 5/1975 | Stevens |
| 3,908,933 A | 9/1975 | Goss et al. |
| 3,920,347 A | 11/1975 | Sauriol et al. |
| 4,023,590 A | 5/1977 | Harris et al. |
| 4,038,789 A | 8/1977 | Axgarde et al. |
| 4,089,139 A | 5/1978 | Moffa et al. |
| 4,111,807 A | 9/1978 | Boomus et al. |
| 4,121,390 A | 10/1978 | Hall et al. |
| 4,187,647 A | 2/1980 | Hall |
| 4,188,151 A | 2/1980 | Hall |
| 4,197,031 A | 4/1980 | Hild |
| 4,410,099 A | 10/1983 | de Larosiere |
| 4,472,911 A | 9/1984 | Jooris et al. |
| 4,508,469 A | 4/1985 | Dumortier |
| 4,508,470 A | 4/1985 | Ferns |
| 4,553,876 A | 11/1985 | Arntyr et al. |
| 4,593,714 A | 6/1986 | Madden |
| 4,659,251 A | 4/1987 | Petter et al. |
| 4,663,036 A | 5/1987 | Strobl, Jr. et al. |
| 4,759,656 A | 7/1988 | Wilson |
| 4,772,154 A | 9/1988 | Caroulle |
| 4,828,274 A | 5/1989 | Stannard |
| 4,842,443 A | 6/1989 | Argandona |
| 4,852,757 A | 8/1989 | Gold |
| 4,960,149 A | 10/1990 | Rizzitiello |
| 4,978,023 A | 12/1990 | Behlmann et al. |
| 4,997,562 A | 3/1991 | Warner |
| 4,998,387 A | 3/1991 | Geiger |
| 5,038,540 A | 8/1991 | Krautz |
| 5,044,818 A | 9/1991 | Pritchard |
| 5,046,886 A | 9/1991 | Muir et al. |
| 5,076,456 A | 12/1991 | Geyer |
| 5,114,271 A | 5/1992 | Sunderhaus et al. |
| 5,201,600 A * | 4/1993 | Topf et al. ............... 404/25 |
| 5,205,668 A | 4/1993 | Adams |
| 5,263,298 A | 11/1993 | Ballesteros |
| 5,279,083 A * | 1/1994 | Savorani ............... 52/102 |
| 5,362,175 A | 11/1994 | Begin |
| 5,366,317 A | 11/1994 | Solimar |
| 5,385,326 A | 1/1995 | Bidwell |
| 5,386,669 A | 2/1995 | Almeida |
| 5,462,386 A | 10/1995 | Prescott et al. |
| 5,470,172 A | 11/1995 | Wiedrich |
| 5,513,926 A | 5/1996 | Prescott |
| 5,525,006 A | 6/1996 | Kilman et al. |
| 5,535,908 A | 7/1996 | Sheu |
| 5,536,110 A | 7/1996 | Tompkins et al. |
| 5,542,780 A | 8/1996 | Kourgli |
| 5,549,411 A | 8/1996 | Hawkins |
| 5,564,855 A * | 10/1996 | Anderson ............... 404/26 |
| 5,617,679 A | 4/1997 | Meyers |
| 5,653,559 A | 8/1997 | Stieb et al. |
| 5,669,523 A | 9/1997 | Mueller et al. |
| 5,800,648 A | 9/1998 | House et al. |
| 5,852,901 A | 12/1998 | Meyers |
| 5,956,905 A * | 9/1999 | Wiedrich ............... 52/20 |
| 6,047,724 A | 4/2000 | Nurse, Jr. |
| 6,088,972 A | 7/2000 | Johanneck |
| 6,161,984 A | 12/2000 | Sinclair et al. |
| 6,195,944 B1 | 3/2001 | Goldthorpe |
| 6,196,760 B1 | 3/2001 | Sinclair et al. |
| 6,484,451 B1 * | 11/2002 | Gavin ............... 52/20 |
| 6,688,072 B1 | 2/2004 | Gavin |
| 7,347,644 B2 | 3/2008 | Meyers |
| 2003/0145527 A1 * | 8/2003 | Meyers ............... 52/20 |

FOREIGN PATENT DOCUMENTS

| | | |
|---|---|---|
| EP | 0 866 179 | 9/1998 |
| GB | 1 507 106 | 4/1978 |
| GB | 1 599 409 | 5/1978 |
| GB | 2 185 053 A | 7/1987 |
| GB | 2 301 848 | 12/1996 |

OTHER PUBLICATIONS

American Manufacturing Company, Inc., catalog entitled "American On-Site Products," Oct. 1989 (pp. 3, 4, 5, and 10).

Brochure for Tuf-Tite Effluent Filters, 2003 (publicly available before Oct. 15, 2003).

The Zabel Zone, Spring 1999, pp. 60, 61 and 77 (showing Zeus™ Access System, including RB-TA-T-26x2).

Digital photos of Zeus TM Access System, Zabel, Retrofit Tank Adapter, understood to be on sale more than one year before Aug. 5, 2004.

Digital photos of Polylok, Inc. Adapter Ring, understood to be on sale more than one year before Oct. 15, 2004.

* cited by examiner

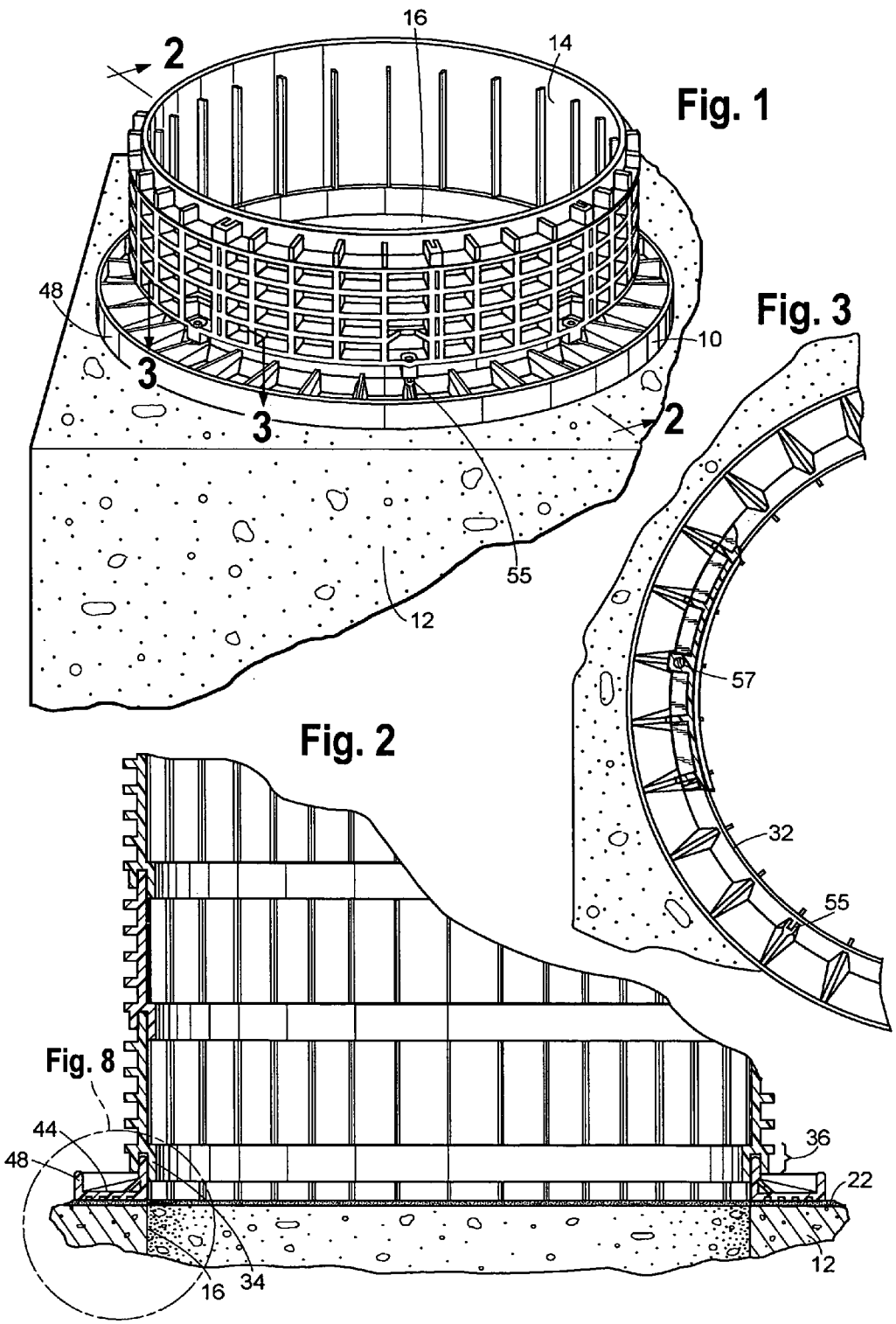

ADAPTER RING FOR ON-SITE WASTE TREATMENT OR DRAINAGE SYSTEMS

BACKGROUND

1. Field of the Disclosure

This disclosure relates generally to stackable riser components for use in providing access to septic tanks and other on-site waste treatment or drainage systems and, more particularly, to adapters for use in providing an interface between, for example, a lowermost stackable riser component and a lid of a septic tank, other on-site waste treatment system, or drainage system, such as a lid made of concrete or similar material.

2. Description of the Prior Art

Stackable riser components have been used to facilitate access to septic tanks and other on-site waste systems, as well as to drainage systems. These tanks and other waste or drainage systems are usually buried underground, and the stackable riser components are used to form a passageway, typically extending from above an opening in a lid of the tank, up to a higher elevation, at or near grade level. In an effort to ensure a secure interface between a stack, or column, of riser components and a lid of a septic tank, waste system, or drainage system, a recommended practice is to cast a lowermost riser component directly in place into the lid, which lid is typically made of concrete.

Those of ordinary skill in the art will understand that the term "concrete lid" or "lid" of the septic tank refers to the large, horizontally-oriented concrete slab, typically on the order of 4 feet by 8 feet, for example, provided at the top of the septic tank having a capacity from about 750 to about 1,250 gallons, and supported by the walls of the septic tank, as opposed to the term "concrete cover" or "cover," which as used herein refers to the movable, generally smaller (and typically round) cover member conventionally associated with an opening in the concrete lid and used to gain access to the interior of the septic tank.

By only following the recommended practice of casting a lowermost stackable riser component directly in place into a concrete lid, there is a predicament when one desires to securely interface a stack of riser components over a tank, sewage waste system, or drainage system having an already-cast concrete lid. As an alternative, there have been attempts at adapters that are intended to adhere to the top of the already-cast concrete lid. For example, Zabel Environmental Technology of Crestwood, Ky. offers adapters (as part of its Zeus™ Access System), such as the 20" tank adapter top, Model #RB-TA-T-20x2, for use in retrofitting existing concrete tank lids. The square-based adapter, shown in cross-section in FIG. 1 of U.S. Pat. No. 6,047,724, has a bottom edge, and is intended to be secured to the concrete lid by applying mastic adhesive to the bottom edge of the adapter top, and pressed onto the top of the concrete lid. That particular prior art adapter is also provided with circumferentially-mounted lugs, intended to pass through slots provided in an inwardly extending flange of a downwardly extending skirt portion of a bottom portion of a lowermost riser of a column, or stack, of risers. Upon rotation of the lowermost riser, the lugs engage inclined stop portions provided in the flange of the lowermost riser, to thereby prevent rotation of that lowermost riser, and thus rotation of a stack of risers, relative to the adapter.

Another adapter intended for installation on previously cast concrete tank lids is the riser adapter ring of Polylok Inc. of Yalesville, Conn. That riser adapter ring is currently available in a single size, having the capacity to fit both 20" and 24" diameter risers. A raised inner wall supports a 20" diameter riser, with vertical ribs positioned on an inside surface of the inner wall. Some of the vertical ribs are provided with screw bosses, which are positioned to align with screw-receiving holes in the interior of a complementary 20" or 24" diameter riser. Screws are used to secure the lowermost riser of a column of risers to the riser adapter ring.

The interior location of the screw bosses in the Polylok adapter ring exposes unprotected portions of the securement screws at the intersection of the adapter ring and lowermost riser to corrosive gases within the column of risers. It would therefore be desirable to position screw bosses on the exterior of an adapter ring, rather than on the interior, so as to better isolate securement screws from corrosive gases within a column of risers leading up from the adapter ring located on the lid of a septic tank.

DESCRIPTION OF THE SEVERAL VIEWS OF THE DRAWING

FIG. 1 is a perspective view of a portion of a concrete lid having an opening therein, an adapter ring of the present disclosure secured to the top of the lid, and a lowermost stackable riser component received on the adapter ring;

FIG. 2 is a cross-sectional view, taken along lines 2-2 of FIG. 1, and with a cross-section of two additional stackable riser components stacked on the lowermost stackable riser component;

FIG. 3 is a top view, partially cut away, of the adapter ring and concrete lid shown in FIG. 1, with a partial horizontal cross-section, taken along lines 3-3 of FIG. 1, of the stackable riser component stacked on the adapter ring;

DETAILED DESCRIPTION OF THE PREFERRED EMBODIMENTS

Figure 4:
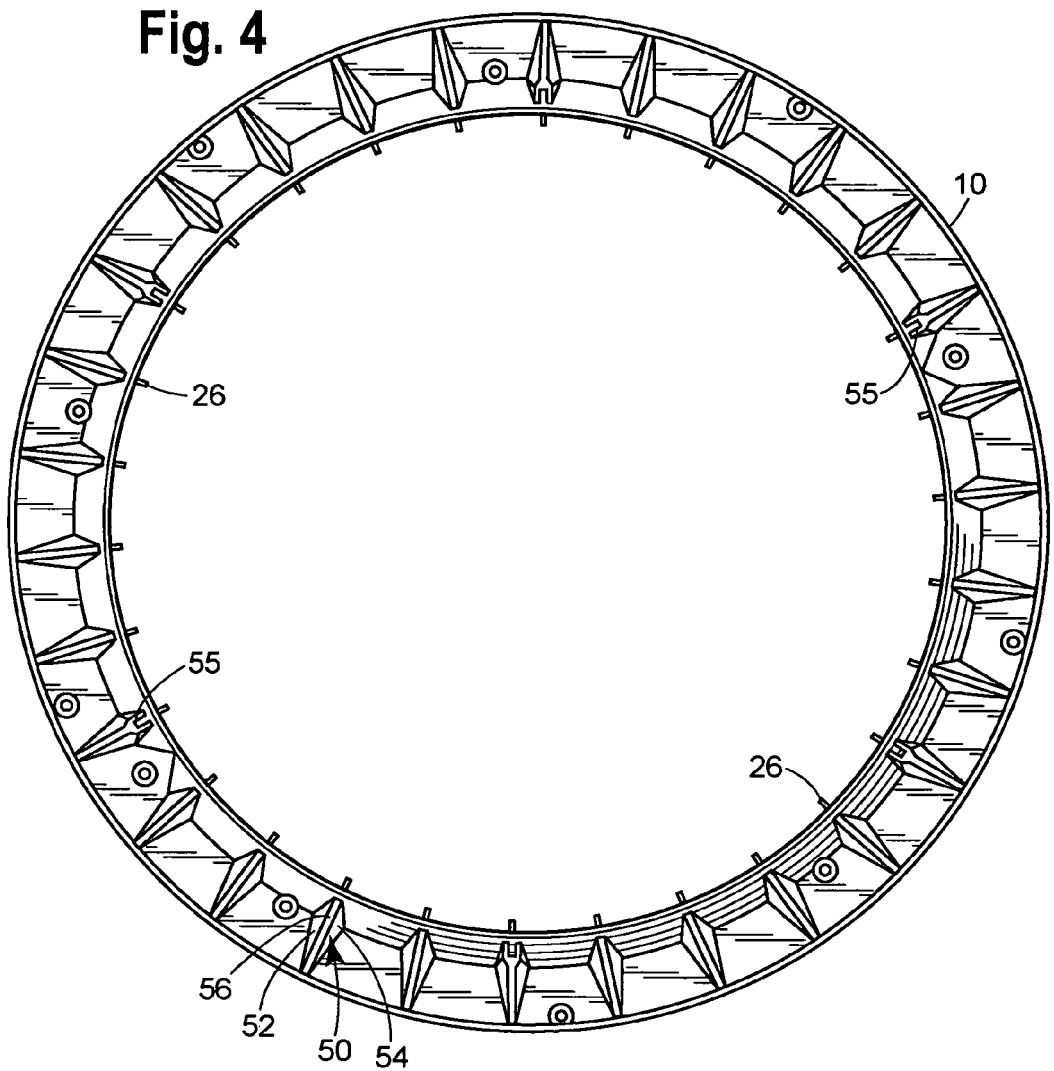
FIG. 4 is a top plan view of an adapter ring of the present disclosure.

With reference to the drawing figures, an adapter ring 10, also generally referred to herein as an adapter, is shown (FIGS. 1-3) in use as an interface between a concrete lid 12 of a septic tank or similar on-site waste disposal system or drainage system, and a lowermost stackable riser component 14. The concrete lid 12 has an access opening or hole 16 therethrough, which could be round, square, or some other shape. This opening or hole 16 permits entry into the interior 17 of a septic tank or other on-site waste disposal system or drainage system for pumping, service, filter changing, inspection, and other maintenance.

The adapter ring 10 has a bottom 18 with one or more channels 20 therein. These channels 20 advantageously increase the surface area of the adapter ring 10 that is exposed to adhesive material 22, such as butyl mastic, by allowing the adhesive material 22 to creep up into the channels 20, thereby improving the strength of the bond between the adapter ring 10 and the concrete lid 12. The channels 20 also form water stops, i.e. upstanding obstacles water must negotiate over, making it more difficult for liquid to find a leakage path between the bottom 18 of the adapter ring 10 with adhesive 22 thereon, and the concrete lid 12, and thus advantageously addressing a leakage problem known in the art as a "short circuit." Notably, in order to avoid requiring excessive quantities of adhesive material 22 to fill the channels 20, the width and depth dimensions of the channels 20 should be small relative to the bottom 18. Generally, no more than half, and preferably a much smaller percentage, of the surface of the bottom 18 is occupied by channels 20.

A ratio of width-to-depth of the channels of no more than about 2:1, and preferably about 1:1, is optimal to achieve an acceptable bond between the adapter ring 10 and a concrete surface without the need for excessive quantities of mastic. Width and depth dimensions of the channels 20 in the range of about 0.05" to about 0.1" are preferred so as to achieve the desired width-to-depth ratios for the channel dimensions while avoiding the need for inordinately large adapters.

The adapter ring 10 (FIG. 6) includes an inner wall 24 extending upwardly from the bottom 18. While the adapter ring 10 is shown to have a round inner wall 24, other shapes, such as ellipsoidal, square, rectangular, or triangular, are possible, and are to be considered within the scope of the present disclosure. The shape of the inner wall 24 of the adapter ring 10 is selected to mate with a female end of a stackable riser component 14, such that if the riser component 14 is round, the inner wall 24 of the adapter ring 10 is also round, but if a square or other-shaped riser were employed, a complementary-shaped inner wall 24 of the adapter ring 10 could be provided for use therewith.

Figure 5:
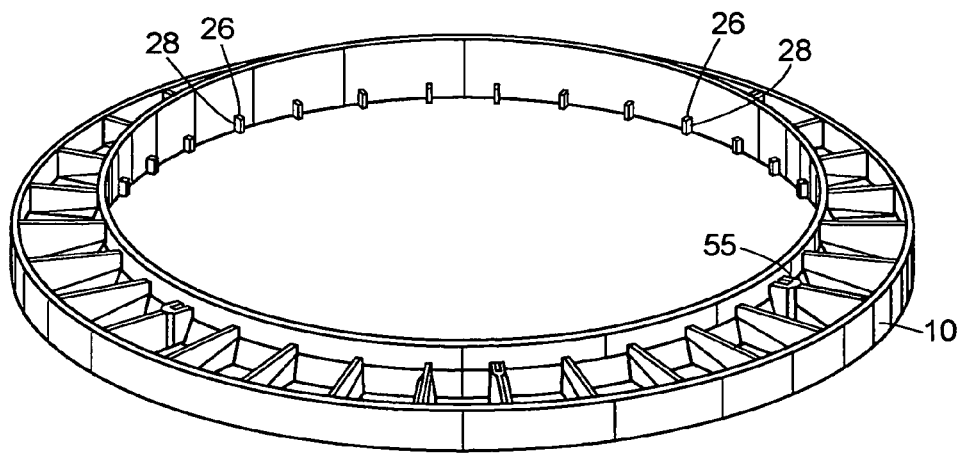
FIG. 5 is an upper elevational view of the adapter ring shown in FIG. 4.
Figure 6:
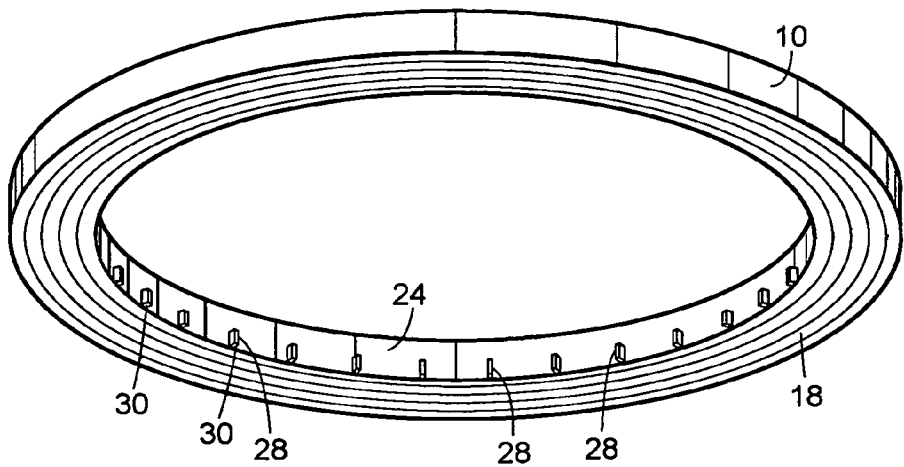
FIG. 6 is a lower elevational view of the adapter ring shown in FIG. 4.
Figure 7:
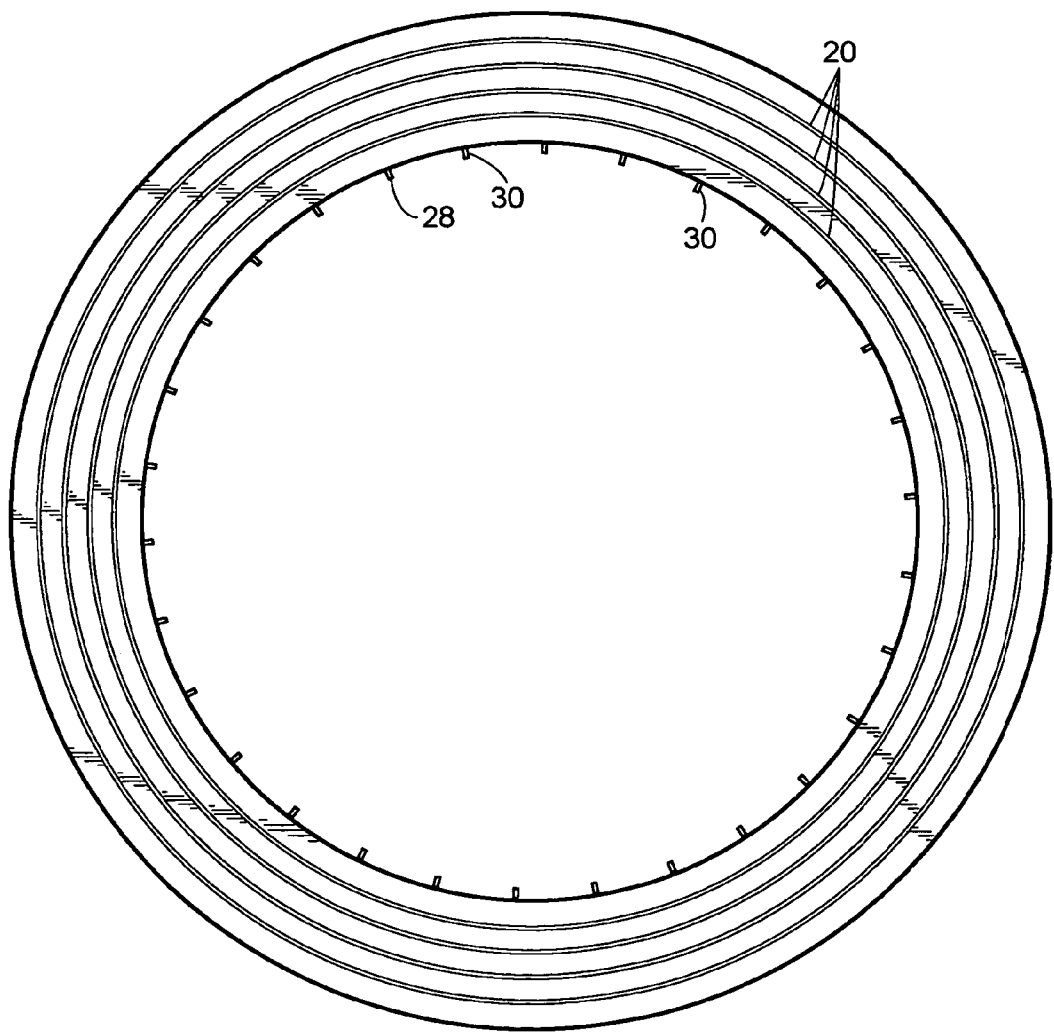
FIG. 7 is a bottom plan view of the adapter ring shown in FIG. 4.

Riser leg support surfaces 26 projecting inwardly from the inner wall 24 are preferably provided. These riser leg support surfaces 26 may, for example, be tops of vertically-oriented inner rib members 28, as shown in FIGS. 5 and 6. The inner rib members 28 preferably extend upwardly from a level even with the bottom 18. If the adapter ring 10 is adhered to the concrete lid 12 in such a manner that the bottoms 30 of the inner rib members 28 are bonded by adhesive to the top of concrete lid 12, then the inner rib members 28 will advantageously be able to transmit any vertical loads borne along their length and down to the concrete lid 12.

Figure 8:
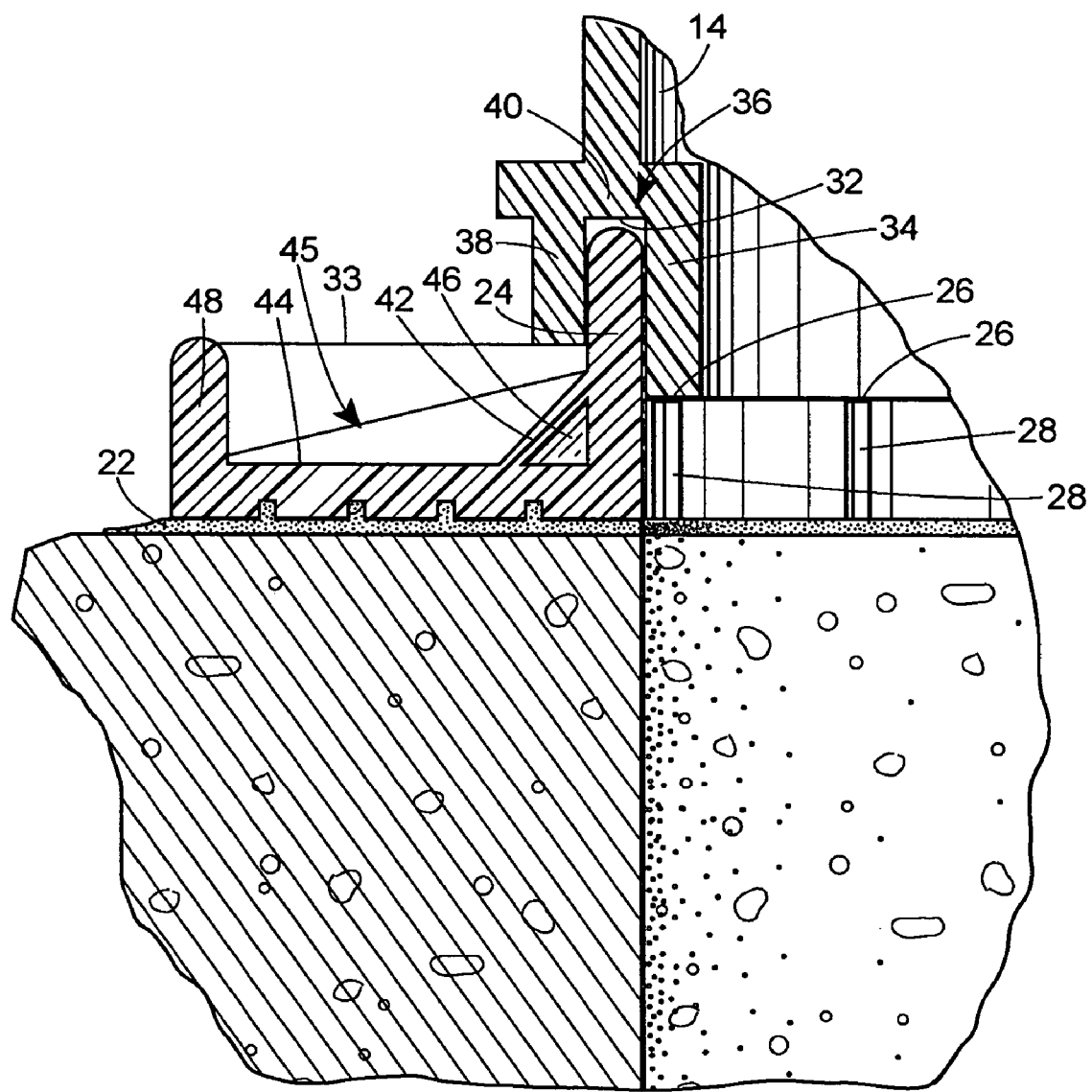
FIG. 8 is an enlarged cross-sectional view of a lower left portion of FIG. 2, corresponding to the area identified by the broken line referenced as "FIG. 8" in FIG. 2.

The riser leg support surfaces 26 are advantageously spaced downwardly from the top 32 of the inner wall 24 (as shown in FIG. 8) such that an inner leg 34 of a connecting member 36 of the riser 14 can rest on the riser leg support surfaces 26. The connecting member 36 has an inverted generally U-shape in cross section, having the inner leg 34 and an outer leg 38, separated by an intermediate portion 40. Risers having such a connecting member are described in U.S. Pat. Nos. 5,617,679 and 5,852,901, owned by the assignee of the present disclosure.

As an alternative to the inner rib members 28, the riser leg support surfaces 26 may instead be part of a series of horizontal ledges (not shown) provided on the interior of the inner wall 24, or may even be the exposed surface of a continuous horizontal edge (not shown), extending along the entire inner perimeter of the inner wall 24. From a manufacturing standpoint, the inner rib members 28 are more advantageous than the continuous ledge alternative, inasmuch as there is no mold penalty (in the form of more complex, and costly, injection mold designs) due to incorporation of the inner rib members 28.

By spacing the riser leg support surfaces 26 some distance down from the top 32 of the inner wall 24, the inner leg 34 of a complementary-sized stackable riser component 14 having a connection member 36 rests on the riser leg support surfaces 26. The outer leg 38 rests on one of the horizontal ribs 33 extending outwardly from the inner wall 24. The intermediate portion 40 of the connection member 36 may be spaced a short distance from the top 32 of the inner wall 24 of the adapter ring 10 when there is no load imparted to the top of the stackable riser component 14, but when loads are imparted thereto, the intermediate portion 40 may come into contact with the top 32 of the inner wall 24. A gasket, or alternatively, butyl mastic, may be interposed between the intermediate portion 40 and the top 32 of the inner wall 24.

The inner wall 24 is reinforced by an angled reinforcement strut 42 (best shown in FIG. 8), which preferably extends substantially the entire outer perimeter of the inner wall 24. In the case of the circular-shaped adapter ring 10 as shown in the drawing figures, the angled reinforcement strut 42 extends about substantially the entire circumference of the inner wall 24, but terminates at 180° intervals. The angled reinforcement strut 42 extends between the inner wall 24 and a top surface 44 of the bottom 18. Known gas assist molding techniques may be employed to form the angled reinforcement strut 42, such that a channel 46 exists between the inner wall 24, the top 44 of the bottom 18, and the angled reinforcement strut 42. The termination points of the angled reinforcement strut 42 at 180° intervals are a result of those gas assist molding techniques.

The adapter ring 10 is also provided with an outer wall 48. The outer wall 48 is at the outside perimeter of the bottom 18. The outer wall 48 is not intended to support any riser components or other structure directly thereon. The outer wall 48 thus serves as a buffering perimeter standing between backfill and the inner wall 24. As such, transverse loads imposed by surrounding backfill (not shown) are absorbed, or at least dampened, by the outer wall 48, providing the inner wall 24 with some measure of protection from the transverse loads. Without protection from transverse loads imposed by surrounding backfill, or sufficient reinforcement, the inner wall 24 would tend to buckle to some extent as a result of the loads, compromising the integrity of the connection between the adapter ring 10 and the next-higher component in a column, such as a riser 14.

As further reinforcement to the inner wall 24 and the angled reinforcement strut 42, additional strut members 45 are provided between the inner wall 24, the angled reinforcement strut 42, the top of the bottom 32, and the outer wall 48. The additional strut members 45 may be formed of a single wall, or more preferably, a tent-like, or inverted V-shaped base 50 formed of first and second wall portions 52, 54, and an upper wall portion 56. Two or more screw bosses 55 (see FIGS. 4 and 5) are provided in certain of the additional strut members 45. By providing the screw bosses 55 on the exterior of the inner wall 24, securement screws 57 used to secure the lower-most riser component 14 to the adapter ring 10 are isolated from the corrosive gases which may be present within the inner wall 24 and column of riser components 12 stacked thereon.

Figure 9:
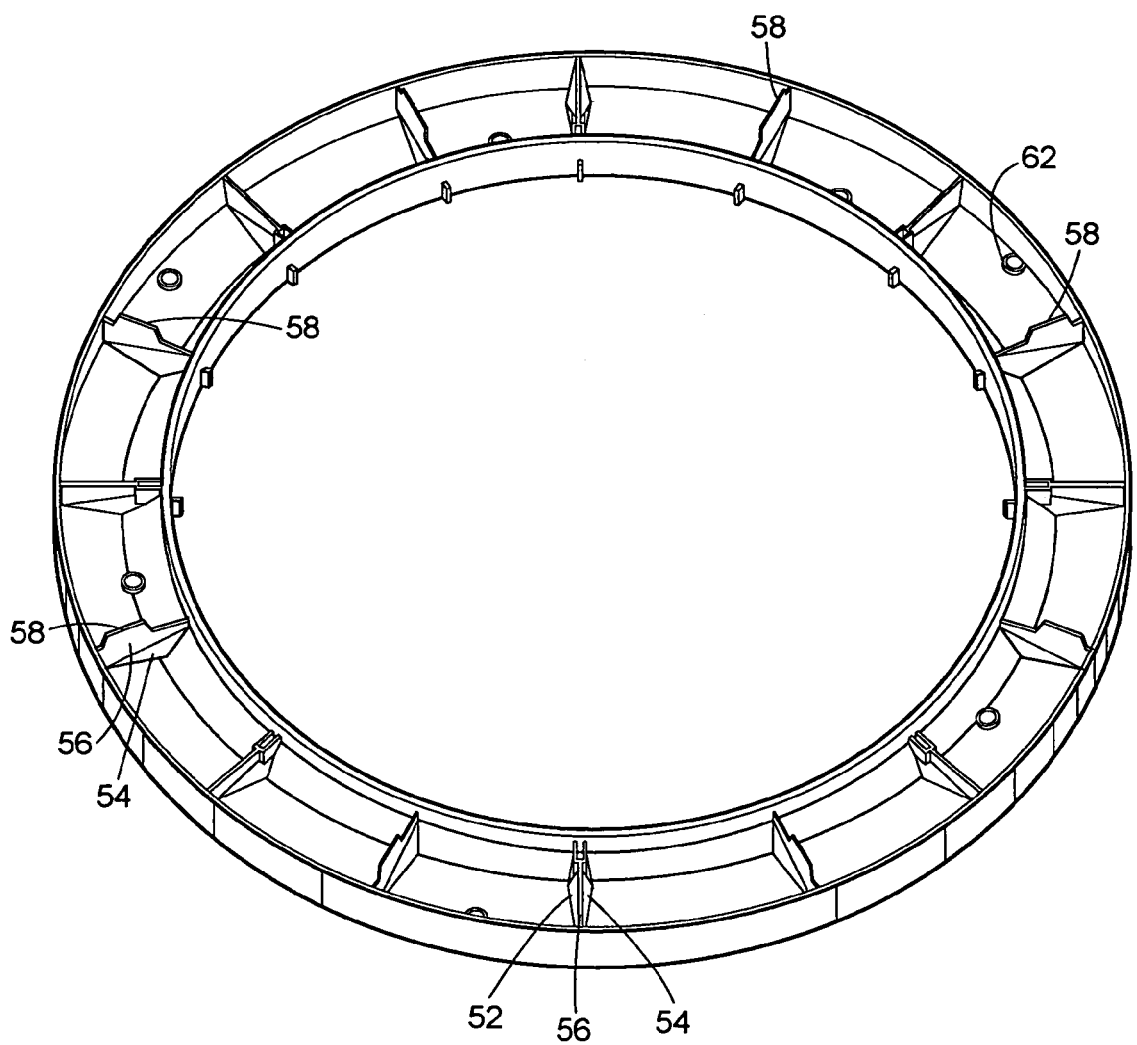
FIG. 9 is an upper elevational view of an alternate embodiment of the adapter ring.
Figure 10:
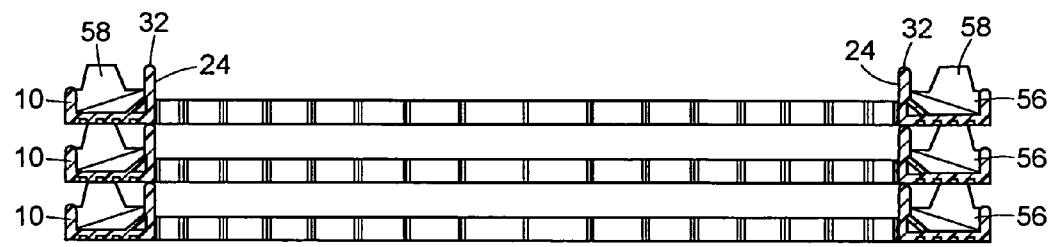
FIG. 10 is a cross-sectional view of a stack of three adapter rings of the type shown in FIG. 9.

Advantageously, as shown in FIGS. 9-10, the upper wall portion 56 of at least some of the additional strut members 45 may be provided with an extension, or stacking fin 58, to facilitate stacking multiple adapter rings 10 together for storage, crating, and shipping purposes.

Figure 10A:
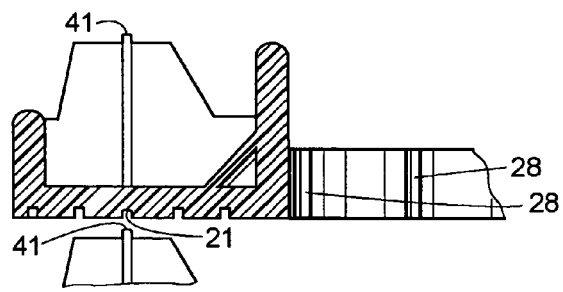
FIG. 10A is a cross-sectional view, broken away, of two adapter rings similar to the type shown in FIG. 9, and further provided with pins and pin-receiving recesses.
Figure 10B:
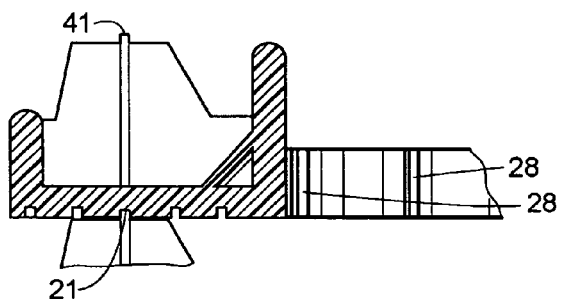
FIG. 10B is a cross-sectional view, broken away, of the two adapter rings shown in FIG. 10A, and wherein the two adapter rings are stacked, with the pin of the lower adapter ring received in the pin-receiving recess of the higher adapter ring.
Figure 10C:
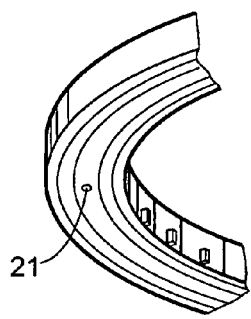
FIG. 10C is a lower elevational view, broken away, of an adapter ring of the type shown in FIGS. 10A and 10B.

Even more preferably, as shown in FIGS. 10A and 10B, stacking fins 58 are provided with pins 41 that project vertically upwardly from the top of the stacking fins 58. When the adapter rings 10 are stacked as shown in FIG. 10B, the pins 41 are received in complementary pin-receiving recesses 21 provided in the bottom 18 of the next-higher adapter ring 10 in the stack. These interlocking pins 41 and pin-receiving recesses 21 advantageously inhibit relative movement of adjacent stacked adapter rings 10.

An important function of the angled reinforcement strut 42 and the additional strut members 45 is to provide strength, rigidity, and support to the adapter ring 10 as a whole, and to the bottom 18 and inner wall 24 in particular, when the adapter ring 10 is placed over a large diameter or polygonal opening in such a way that some of the inside wall 24 and bottom 18 is positioned directly over the opening, without any concrete lid 12 underneath, i.e. in a cantilevered fashion.

The top surface 44 of the bottom 18 is preferably provided with raised circular bosses 60, each having an angled interior surface 62. Each of the raised circular bosses 60 defines a location for a user to drill a hole through the adapter ring 10 and underlying adhesive 22, and into the concrete lid 12. Nails, screws, or other rod fastener members (not shown) may then be used to stabilize the adapter 10, and any stackable risers 14 that may be provided thereon, against lateral movement.

Figure 11:
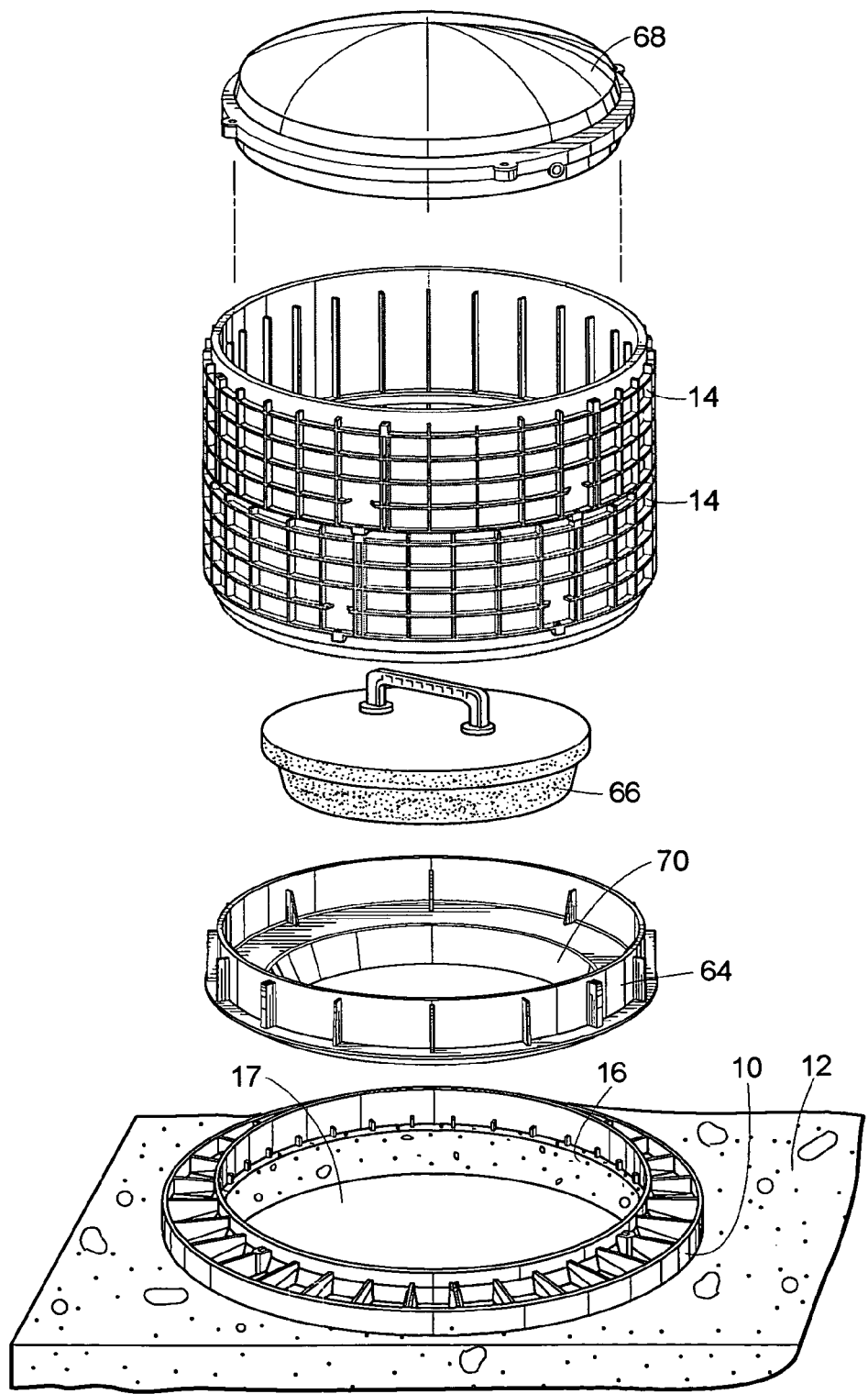
FIG. 11 is an exploded view of an adapter ring of the type shown in FIGS. 1-8, mounted on a concrete lid, in combination with a riser pan, a concrete cover received in a frustroconical portion of the riser pan, a pair of stackable riser components, and a riser cover.

The adapter ring 10 may also receive a riser pan 64 (as shown in FIG. 11), such as the riser pan components disclosed in U.S. patent application Ser. No. 10/352,086, published as US 2003/0145527 A1, also owned by the assignee of the present disclosure. The use of a riser pan 64 in association with an adapter ring 10 advantageously allows a secondary cover, such as a concrete cover 66, to be placed in a stack of stackable riser components 14 at an elevation higher than the concrete lid 12 of the tank on which the adapter ring 10 may be secured.

As illustrated in FIG. 11, the adapter ring 10 could be used in combination with stackable riser components 14 and a riser pan 64 such that the adapter ring 10 is secured to the top of a concrete lid 12, a riser pan 64 is then received on the adapter ring 10, and as many stackable riser components 14 as are needed to reach a desired elevation, such as grade level, are then received in a column on the riser pan 64. A riser cover 68 may be received on the uppermost stackable riser component 14, and a secondary cover, such as a concrete cover 66, may be received in the frustro-conical portion 70 of the riser pan 64.

Figure 12:
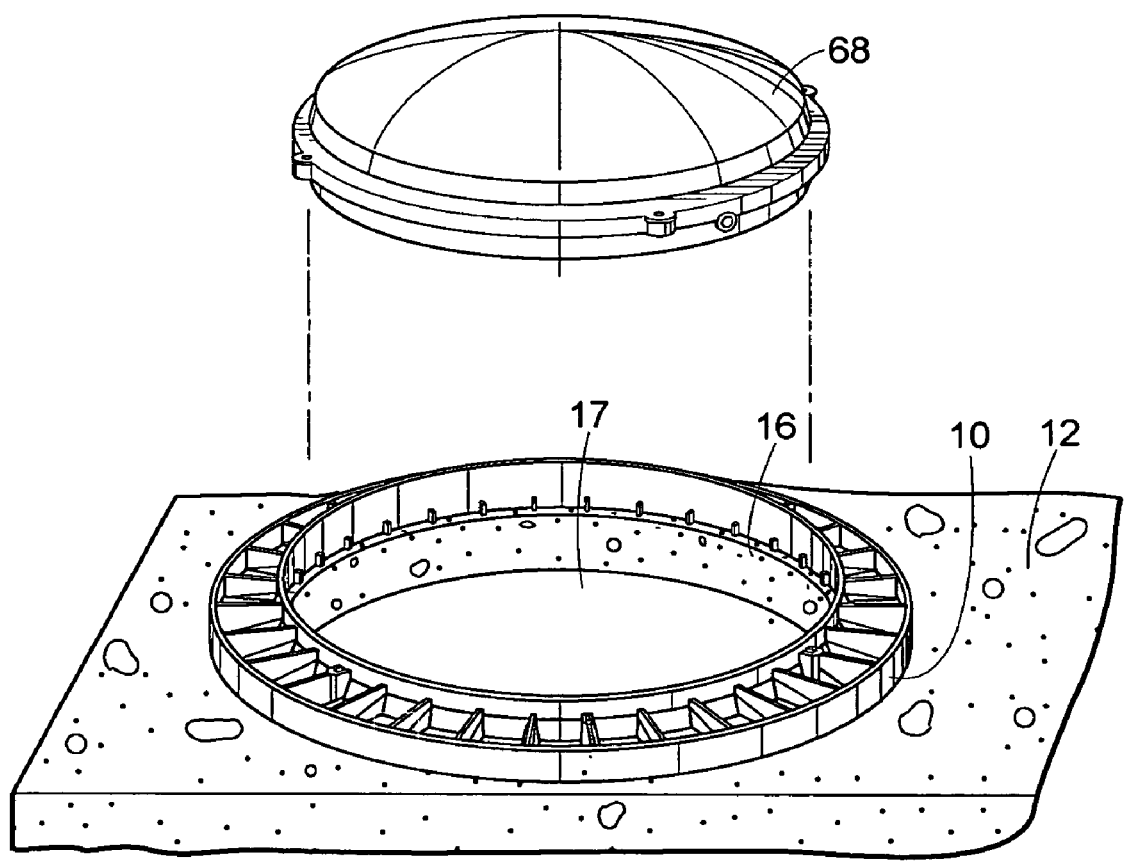
FIG. 12 is an exploded view of an adapter ring of the type shown in FIGS. 1-8, mounted on a concrete lid, in direct combination with a riser cover, without any stackable riser components between the adapter ring and the riser cover.

Another advantageous arrangement of components facilitated by the adapter ring 10 is shown in FIG. 12, in which a riser cover 68 is shown oriented directly over an adapter ring 10 secured to a lid 12 in the above-described manner, without any intermediate stackable riser components. Preferably, the riser cover 68 is provided with its own molded-in gasket, such that the riser cover 68 may be secured directly to the adapter ring 10 without the need for additional sealant, such as butyl mastic, and still achieve a substantially liquid tight closure. Such an adapter ring 10 and riser cover 68-only combination might be used in end-use applications where there is only shallow backfill, i.e. of less than one riser's height, over the septic tank (e.g., less than 6"), or where there is no need for full time access at grade level, via a column of stackable risers, over a particular tank opening, since there are one or more other tank openings with ground access riser columns over them for a given tank.

Figure 13:
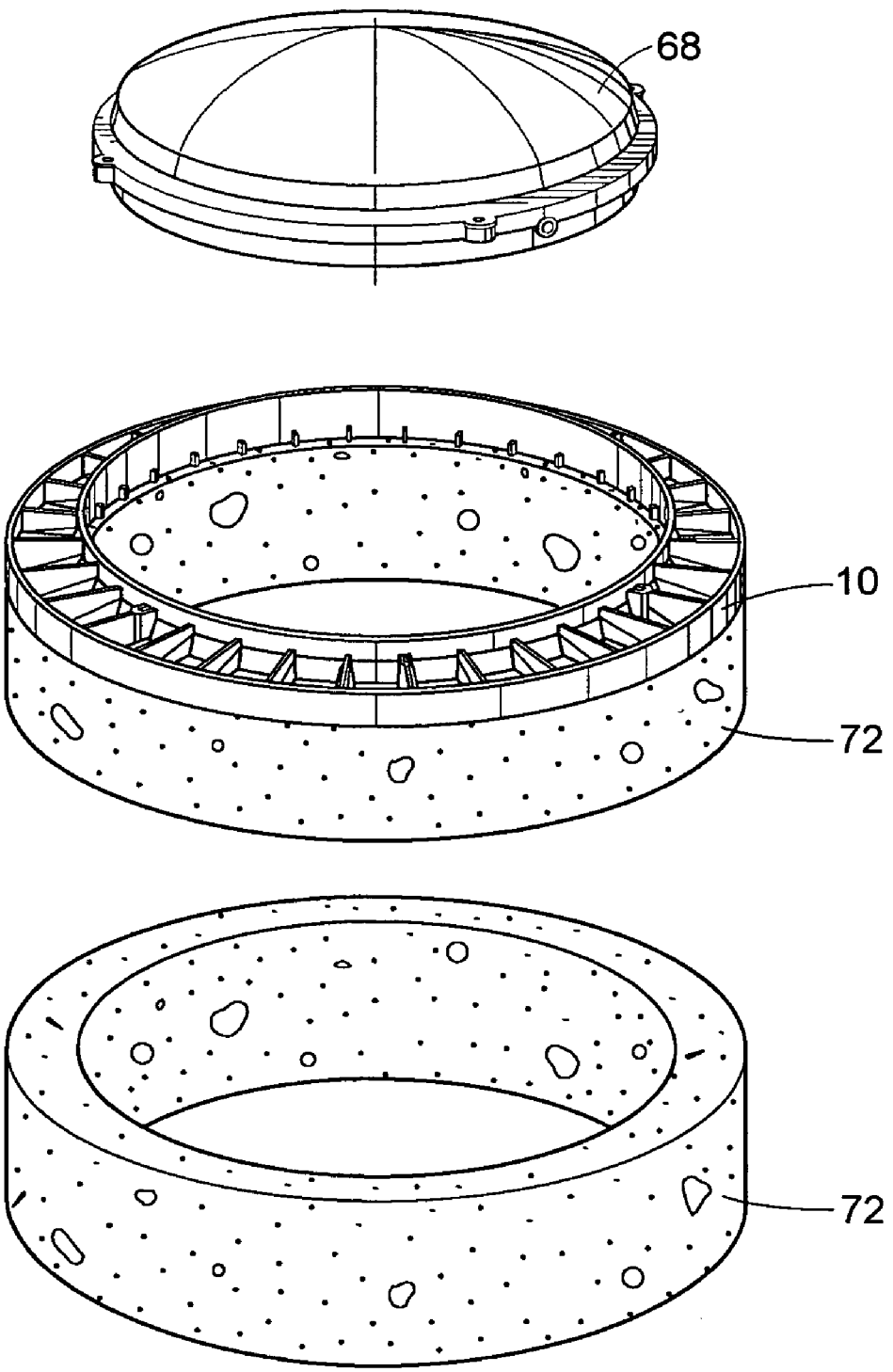
FIG. 13 is a partially exploded view of an adapter ring of the type shown in FIGS. 1-8, mounted on an upper concrete riser situated on a lower concrete riser, in direct combination with a riser cover, without any stackable riser components between the adapter ring and the riser cover.

Yet another advantageous arrangement of components facilitated by the adapter ring 10 is shown in FIG. 13. In that partially exploded view, an adapter ring 10 is shown secured directly to an upper concrete riser 72. The upper concrete riser 72 can be stacked over another concrete riser 72. The adapter ring 10 advantageously enables a riser cover 68 to be utilized to cap-off a column or stack of concrete risers 72. It will be understood by those in the art that the various arrangements shown are exemplary, and that any of the various components shown stacked on adapter rings 10 of other drawing figures could likewise be stacked onto the adapter ring 10 as shown in FIG. 13. Thus, as an alternative to stacking a riser cover 68 on the adapter ring 10 in FIG. 13, one could stack a riser pan 64 of a stackable riser component 14, thereby increasing the versatility of a stack of conventional concrete risers.

It is typical for stackable riser systems to be vacuum-tested in order to predict their resistance to leakage. The following test procedures may be utilized to demonstrate the performance of an adapter ring 10 under vacuum testing: First, place an adapter ring 10 down on a concrete slab with an adhesive material 22 consisting of butyl mastic rope therebetween. Next, place a column of stackable riser components 14 on the adapter ring 10, using additional adhesive material 22 in the form of butyl mastic rope between adjacent risers 14, and between the lowermost riser 14 and the adapter ring 10. Provide a plastic riser cover 68 on top of the column of risers 14, with a foamed-in polyurethane gasket (not shown) provided within a channel of the plastic riser cover 68. Next, secure the plastic riser cover 68 to the uppermost riser 14 using screws. Then, for test purposes, using a vacuum pump and vacuum gauge, draw a 10" vacuum in that now erected system of adapter plate, riser stack, and cover. In testing according to these procedures, it has been found that the assembled system (including an adapter ring 10, column of risers 14, and riser cover 68) withstands 10" vacuum for at least 30 minutes.

While various embodiments of adapter rings and combinations of adapter rings with various components have been disclosed herein, it is understood that variations may be made thereto without departing from the scope of the appended claims.

I claim:

1. An adapter for use on a lid of a tank of an on-site waste treatment or drainage system, comprising:
   a bottom having an upper surface and a lower surface and defining a central opening, the lower surface generally defining a first plane and adapted to abut a planar surface on the lid of the tank, the upper surface generally defining a second plane;
   one or more upwardly extending, downwardly open channels formed in the bottom and operable to receive adhesive, the channels extending into the bottom from the first plane and terminating between the first plane and the second plane;

an inner wall extending upward of the upper surface and surrounding the opening;

an outer wall extending upward of the upper surface; and one or more reinforcement struts extending from the inner wall to at least one of the outer wall and the upper surface of the bottom, wherein each of the one or more channels is between an innermost surface of the inner wall and an outermost surface of the outer wall.

2. The adapter of claim 1, further including one or more riser leg support surfaces provided on an interior of the inner wall.

3. The adapter of claim 2, wherein each of the one or more riser leg support surfaces is a top of an inner rib member provided on the interior of the inner wall.

4. The adapter of claim 3, wherein each of the inner rib members is vertically oriented.

5. The adapter of claim 4, wherein each of the inner rib members extends from the bottom to a distance from a top of the inner wall intermediate the top of the inner wall and the bottom.

6. The adapter of claim 1, further comprising a plurality of reinforcement wall members extending between the inner wall and the outer wall.

7. The adapter of claim 6, wherein the reinforcement wall members extend substantially to a height of the outer wall.

8. The adapter of claim 7, wherein three or more of the reinforcement wall members include a stacking fin thereon bringing the height of said reinforcement wall members including the stacking fin substantially to a height of the inner wall, whereby another adapter may be stacked on the adapter.

9. The adapter of claim 8, further including a pin extending vertically upwardly from at least one of the stacking fins.

10. The adapter of claim 9, further including a pin-receiving recess in the bottom, said pin-receiving recess sized to securely receive a pin extending vertically upwardly from a stacking fin of a next-lower like adapter when stacked thereon.

11. The adapter of claim 1, wherein the inner wall has a greater height than the outer wall.

12. The adapter of claim 1, further comprising screw bosses disposed exteriorly of the inner wall.

13. The adapter of claim 12, wherein the screw bosses are disposed in at least two of the reinforcement struts.

14. The adapter of claim 1, wherein each of the one or more upwardly extending, downwardly open channels has a ratio of width-to-depth of about 2:1.

15. The adapter of claim 14 wherein the width is about 0.1" and the depth is about 0.05".

16. The adapter of claim 1 wherein each of the one or more upwardly extending, downwardly open channels has a ratio of width-to-depth of about 1:1.

17. The adapter of claim 16 wherein the width is about 0.1" and the depth is about 0.1".

18. The adapter of claim 16 wherein the width is about 0.05" and the depth is about 0.05".

19. The adapter of claim 1, wherein each of the one or more upwardly extending, downwardly open channels has a width in the range of about 0.05" to about 0.1".

20. The adapter of claim 1, wherein each of the one or more upwardly extending, downwardly open channels has a depth in the range of about 0.05" to about 0.1".

* * * * *